(12) United States Patent
He et al.

(10) Patent No.: US 11,922,270 B2
(45) Date of Patent: Mar. 5, 2024

(54) METHODS AND APPARATUS TO LOCATE BARCODES IN COLOR IMAGES

(71) Applicant: ZEBRA TECHNOLOGIES CORPORATION, Lincolnshire, IL (US)

(72) Inventors: Duanfeng He, South Setauket, NY (US); Eugene B. Joseph, Coram, NY (US); Peizheng Ma, Port Jefferson, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 0 days.

(21) Appl. No.: 17/510,757

(22) Filed: Oct. 26, 2021

(65) Prior Publication Data
US 2023/0128240 A1 Apr. 27, 2023

(51) Int. Cl.
*G06K 7/14* (2006.01)
*G06V 30/18* (2022.01)
*G06V 30/224* (2022.01)

(52) U.S. Cl.
CPC ......... *G06K 7/1443* (2013.01); *G06K 7/1417* (2013.01); *G06K 7/1452* (2013.01); *G06V 30/18105* (2022.01); *G06V 30/2247* (2022.01)

(58) Field of Classification Search
CPC .. G06K 7/1443; G06K 7/1417; G06K 7/1452; G06V 10/56; G06V 30/2247
See application file for complete search history.

(56) References Cited

PUBLICATIONS

Y. Zhang and T. Lu, "A fast color barcode detection method through cross identification on mobile platforms," 2015 13th International Conference on Document Analysis and Recognition (ICDAR), 2015, pp. 416-420, doi: 10.1109/ICDAR.2015.7333795. (Year: 2015).*
How to Use Region Predetection. Barcode Reader. Retrieved Oct. 10, 2023, from https://www.dynamsoft.com/barcode-reader/docs/core/parameters/scenario-settings/how-to-use-region-predetection.html.

* cited by examiner

*Primary Examiner* — Matthew Mikels

(57) ABSTRACT

Methods and apparatus to locate barcodes in color images are disclosed. An example method includes: obtaining a color digital image using an image sensor, the image including a plurality of pixels represented by respective ones of a plurality of luminance components and respective ones of a plurality of color components; determining, based on the luminance components, a plurality of barcode indicative characteristics for respective ones of a plurality of regions of the image; determining, based on the plurality of color components, a plurality of color content amounts for respective ones of the plurality of regions; identifying one or more regions of the plurality of regions that have their respective color content amount satisfy a first criteria, and their respective barcode indicative characteristic satisfy a second criteria; and processing image data corresponding to each of the one or more regions to attempt to identify one or more barcodes in the image.

24 Claims, 7 Drawing Sheets

METHODS AND APPARATUS TO LOCATE BARCODES IN COLOR IMAGES

BACKGROUND

It may be necessary to decode barcodes in images that contain numerous non-barcode graphical elements and text. In such images, it may be difficult to identify the barcodes as distinct from the graphical elements and text. In some past examples, barcodes are identified by computing feature densities, and comparing the feature densities to a threshold to identify regions of the image that may contain a barcode. However, other graphical elements and text may also represent feature densities that exceed the threshold. Therefore, a barcode decoder may waste processing time attempting to decode barcodes in regions of an image that do not contain barcodes. Thus, there is a need for methods and apparatus to locate barcodes in images.

SUMMARY

To reduce or eliminate some or all of these, or other problems of conventional barcode decoding, example methods, systems and articles of manufacture for locating and decoding barcodes in color images are disclosed.

In an embodiment, a method for locating barcodes comprises: obtaining a color digital image using, directly or indirectly, an image sensor, wherein the color digital image includes a plurality of pixels represented by respective ones of a plurality of luminance components and respective ones of a plurality of color components; determining, based on the plurality of luminance components, a plurality of barcode indicative characteristics for respective ones of a plurality of regions of the color digital image; determining, based on the plurality of color components, a plurality of color content amounts for respective ones of the plurality of regions; identifying one or more regions of the plurality of regions that have their respective color content amount satisfy a first criteria, and their respective barcode indicative characteristic satisfy a second criteria; and processing at least some image data corresponding to each of the one or more regions of the color digital image to attempt to identify one or more barcodes in the color digital image.

In a variation of this embodiment, a respective color content amount satisfies the first criteria when the respective color content amount is less than a predetermined threshold, the predetermined threshold representing a small color content amount.

In a variation of this embodiment, a respective barcode indicative characteristic satisfies the second criteria when a feature density is greater than a predetermined threshold, the predetermined threshold representing a feature density indicative of a barcode.

In a variation, the feature density for a region represents a number of features detected in the region.

In a variation of this embodiment, the barcode indicative characteristic for a region include at least one of a dot, a line, a corner, an L-shape, a contrast, or a bullseye.

In a variation of this embodiment, the determining the barcode indicative characteristics for respective ones of the plurality of regions comprises: determining, based on the plurality of luminance components, a plurality of feature densities for respective ones of a plurality of pixels; and grouping the plurality of feature densities to form the barcode indicative characteristics.

In a variation, the grouping the plurality of feature densities includes computing averages over subsets of the plurality of feature densities.

In a variation of this embodiment, the method further comprises selecting a size of the plurality of regions based on an expected size of the barcode.

In a variation of this embodiment, the method is performed for each of the plurality of regions having a first size, and further comprises repeating the method for each of the plurality of regions having a second size.

In a variation of this embodiment, the color digital image is a processed color digital image, and the obtaining the processed color digital image using the image sensor includes: capturing a first color digital image with the imaging sensor; receiving the first color digital image at a processor from the image sensor; and converting, at the processor, the first color digital image to the processed color digital image.

In a variation, the first color digital image is encoded using an RBG color-encoding scheme, and the processed color digital image is encoding using a YUV color-encoding scheme.

In a variation of this embodiment, the obtaining the color digital image using the image sensor includes capturing the color digital image with image sensor.

In a variation of this embodiment, the color digital image is encoded using a YUV color-encoding scheme, a luminance component of a pixel corresponds to a Y component, a color component of a pixel corresponds to a U component, an additional color component of a pixel corresponds to a V component, and a color content amount for a region is the largest of the U components and the V components of the pixels in the region.

In another embodiment, an apparatus comprises: an image sensor configured to capture a first color digital image; a processor configured to: convert the first color digital image to a second color digital image, wherein the second color digital image includes a plurality of pixels represented by respective ones of a plurality of luminance components and respective ones of a plurality of color components; determine, based on the plurality of luminance components, a plurality of barcode indicative characteristics for respective ones of a plurality of regions of the second color digital image; determine, based on the plurality of color components, a plurality of color content amounts for respective ones of the plurality of regions; and identify one or more regions of the plurality of regions that have their respective color content amount satisfy a first criteria, and their respective barcode indicative characteristic satisfy a second criteria; and a barcode decoder configured to process at least some image data corresponding to each of the one or more regions to attempt to identify one or more barcodes in the second color digital image.

In a variation of this embodiment, a respective color content amount satisfies the first criteria when the respective color content amount is less than a predetermined threshold, the predetermined threshold representing a small color content amount.

In a variation of this embodiment, a respective barcode indicative characteristic satisfies the second criteria when a feature density is greater than a predetermined threshold, the predetermined threshold representing a feature density indicative of a barcode.

In a variation of this embodiment, the first color digital image is encoded using an RGB color-encoding scheme, the second color digital image is encoded using a YUV color-encoding scheme, a luminance component of a pixel corresponds to a Y component, a color component of a pixel corresponds to a U component, an additional color component of a pixel corresponds to a V component, and a color content amount for a region is the largest of the U components and the V components of the pixels in the region.

In a variation of this embodiment, the processor is further configured to determine the barcode indicative characteristics for respective ones of the plurality of regions by: determining, based on the plurality of luminance components, a plurality of feature densities for respective ones of a plurality of pixels; and binning the plurality of feature densities to form the barcode indicative characteristics.

In a further embodiment, a non-transitory, computer-readable, storage medium stores computer-readable instructions that, when executed by one or more processors, cause a system to: obtain a color digital image using, directly or indirectly, an image sensor, wherein the color digital image includes a plurality of pixels represented by respective ones of a plurality of luminance components and respective ones of a plurality of color components; determine, based on the plurality of luminance components, a plurality of barcode indicative characteristics for respective ones of a plurality of regions of the color digital image; determine, based on the plurality of color components, a plurality of color content amounts for respective ones of the plurality of regions; identify one or more regions of the plurality of regions that have their respective color content amount satisfy a first criteria, and their respective barcode indicative characteristic satisfy a second criteria; and process at least some image data corresponding to each of the one or more regions to attempt to identify one or more barcodes in the color digital image.

In a variation of this embodiment, the color digital image is a processed color digital image, and the computer-readable instructions, when executed by the one or more processors, cause the system to obtain the processed color digital image using the image sensor by: capturing a first color digital image with the image sensor, wherein the first color digital image is encoded using a first color-encoding scheme; receive the first color digital image from the image sensor; and converting the first color digital image to the processed color digital image, wherein the processed color digital image is encoded using a second color-encoding scheme.

In a variation of this embodiment, a respective color content amount satisfies the first criteria when the respective color content amount is less than a predetermined threshold, the predetermined threshold representing a small color content amount.

In a variation of this embodiment, a respective barcode indicative characteristic satisfies the second criteria when a feature density is greater than a predetermined threshold, the predetermined threshold representing a feature density indicative of a barcode.

In a variation of this embodiment, the color digital image is encoded using a YUV color-encoding scheme, a luminance component of a pixel corresponds to a Y component, a color component of a pixel corresponds to a U component, an additional color component of a pixel corresponds to a V component, and a color content amount for a region is the largest of the U components and the V components of the pixels in the region.

In a variation of this embodiment, the computer-readable instructions, when executed by the one or more processors, cause the system to determine the barcode indicative characteristics for respective ones of the plurality of regions by: determining, based on the plurality of luminance components, a plurality of feature densities for respective ones of a plurality of pixels; and binning the plurality of feature densities to form the barcode indicative characteristics.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
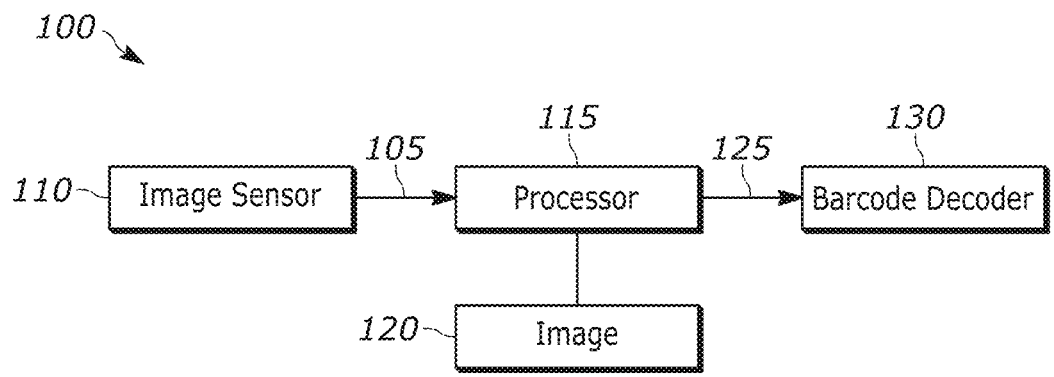
FIG. 1 is a block diagram of an example system for locating and decoding barcodes in color images, in accordance with embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Reference will now be made in detail to non-limiting examples, some of which are illustrated in the accompanying drawings.

FIG. 1 illustrates an example system 100 for locating and decoding barcodes in color images. While the following description refers to locating and decoding barcodes in color images, one of ordinary skill in the art will recognize the disclosed devices, systems, methods, etc. may be used to decode other types of indicia (e.g., direct product markings) in color images.

To capture color images 105, the system 100 includes any number and/or type(s) of example color image sensors 110. The image sensor 110 captures, using a plurality of color and/or luminance filters and a plurality of photosensitive elements, pixel data of an image 105 representing a portion of an environment in which the system 100 is operating that falls within a field of view (FOV) the image sensor 110. For example, an image 105 captured by the image sensor 110 may be encoded with an RGB (red-blue-green), YUV (luminance-color-color), YCbCr, Lab, etc. color-encoding scheme.

Figure 6:
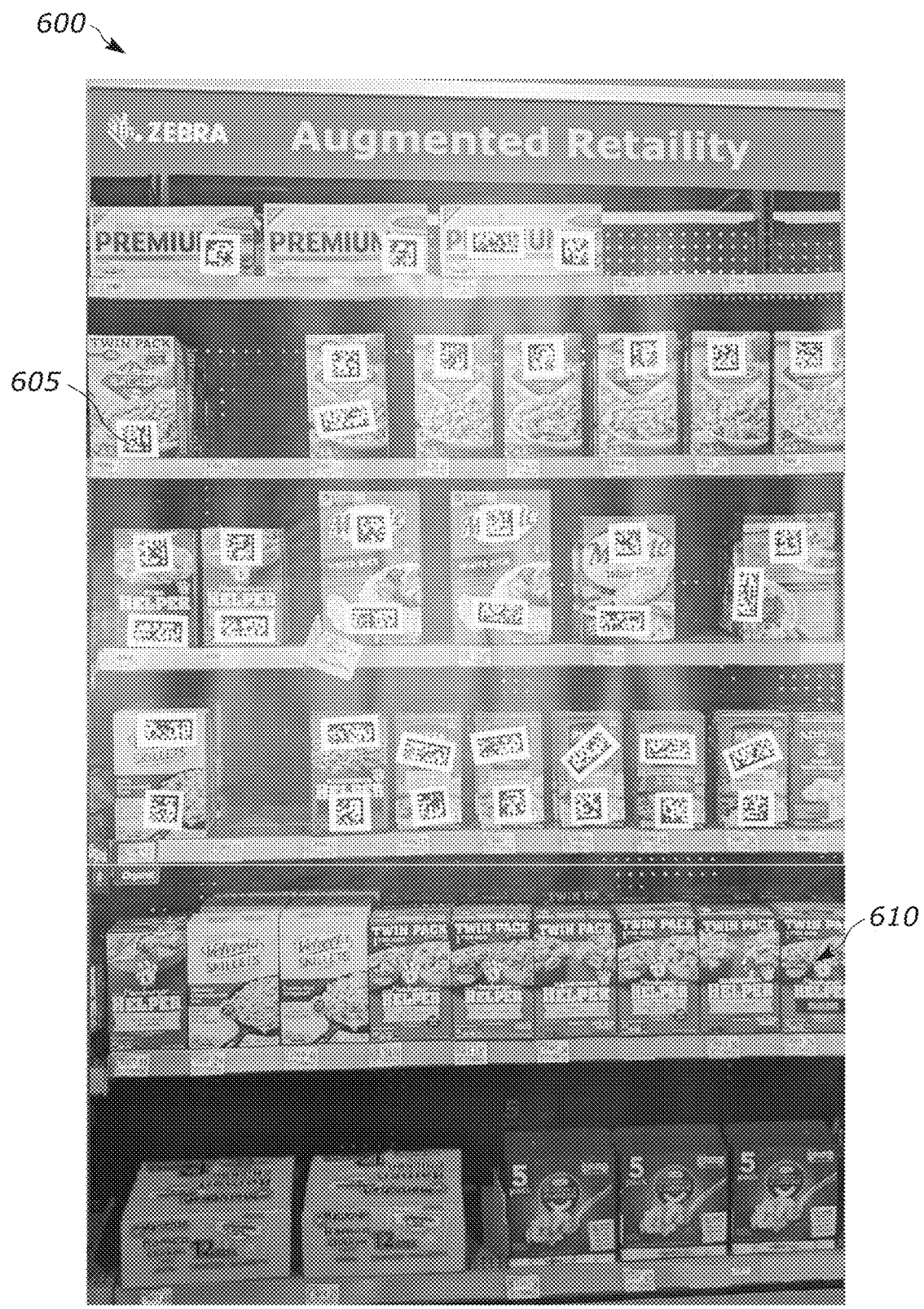
FIG. 6 is an example grayscale representation of an example color image that contains barcodes.

FIG. 6 is an example grayscale representation of an example color image 600 that includes a plurality of barcodes (one of which is designated at reference numeral 605), and a plurality of feature-rich non-barcode areas (one of which is designated at reference numeral 610).

To locate barcodes in a color image 105, the system 100 includes one or more example processors 115. The processor 115 may be any type of processor capable of being configured for processing pixel data to identify regions 125 of a color image 105 (e.g., based on one or more barcode indicative characteristics) that likely contain a barcode. For example, the processor 115 may process, using any number and/or type(s) of algorithms, methods, etc., a color image 105 to identify regions of the color image 105 that have feature densities that are indicative of a barcode. Example features that may be detected include corners, dots, etc. An example feature density of a region of the color image 105 representative of the number of features detected in the region. A feature density of a region of the color image 105 may be computed by detecting, determining, etc. whether or not a feature is present at each pixel of the region, and assigning a first value (e.g., "1") to a pixel when a feature is found, and assigning a second value (e.g., "0") to the pixel when a feature is not found. In some examples, the assigned values are then grouped and/or binned to compute a feature density for the region by, for example, computing an average of the assigned values for the region. An example grouping/binning ratio is 16:1 such that the highest frequency feature densities most representative of a barcode are preserved. The ratio may be adaptively set to correspond to the expected size(s) of the barcodes. Additionally and/or alternatively, the processor 115 may process, using any number and/or type(s) of algorithms, methods, etc., a color image 105 to identify other barcode indicative characteristics. Example barcode indicative characteristics include a contrast map, bullseyes, "L"s (i.e., something having an L-shape), etc. In some examples, "L"s differ from corners in scale. For example, corners may be found in small neighborhoods (e.g., in a region of 8 pixels by 8 pixels or smaller), while "L"s are bigger (e.g., 15 pixels by 15 pixels or larger. Thus, an "L" includes a corner, but a corner may not be part of an "L".

In some examples, the size and/or shape of the regions are selected based upon the expected sizes and/or shapes of the barcodes in the color image 105 to be decoded. Thus, if differently sized and/or shaped barcodes are to be located and decoded, the examples disclosed herein may be repeated with differently sized and/or shaped regions. In some examples, the sizes and/or shapes of the regions are pre-determined. In other examples, the sizes and/or shapes of the regions are adaptively determined based on the sizes and/or shapes of identified barcodes. For example, if only partial barcodes are being located, then the sizes and/or shapes of the regions could be adjusted.

In some examples, barcode indicative characteristics are detected based upon the luminance components of the color image 105 (e.g., the Y components of an image encoded using the YUV color-encoding scheme). Thus, in some examples, when the color images 105 provided by the image sensor 110 is encoded according to a color-encoding scheme that does not separate out luminance (e.g., according to the RGB color-encoding scheme), the processor 115 converts the image 105 provided by the image sensor 110 to a second image 120 that is encoded according to, for example, the YUV, YCbCr, Lab, etc. color-encoding scheme before detecting features.

Figure 7:
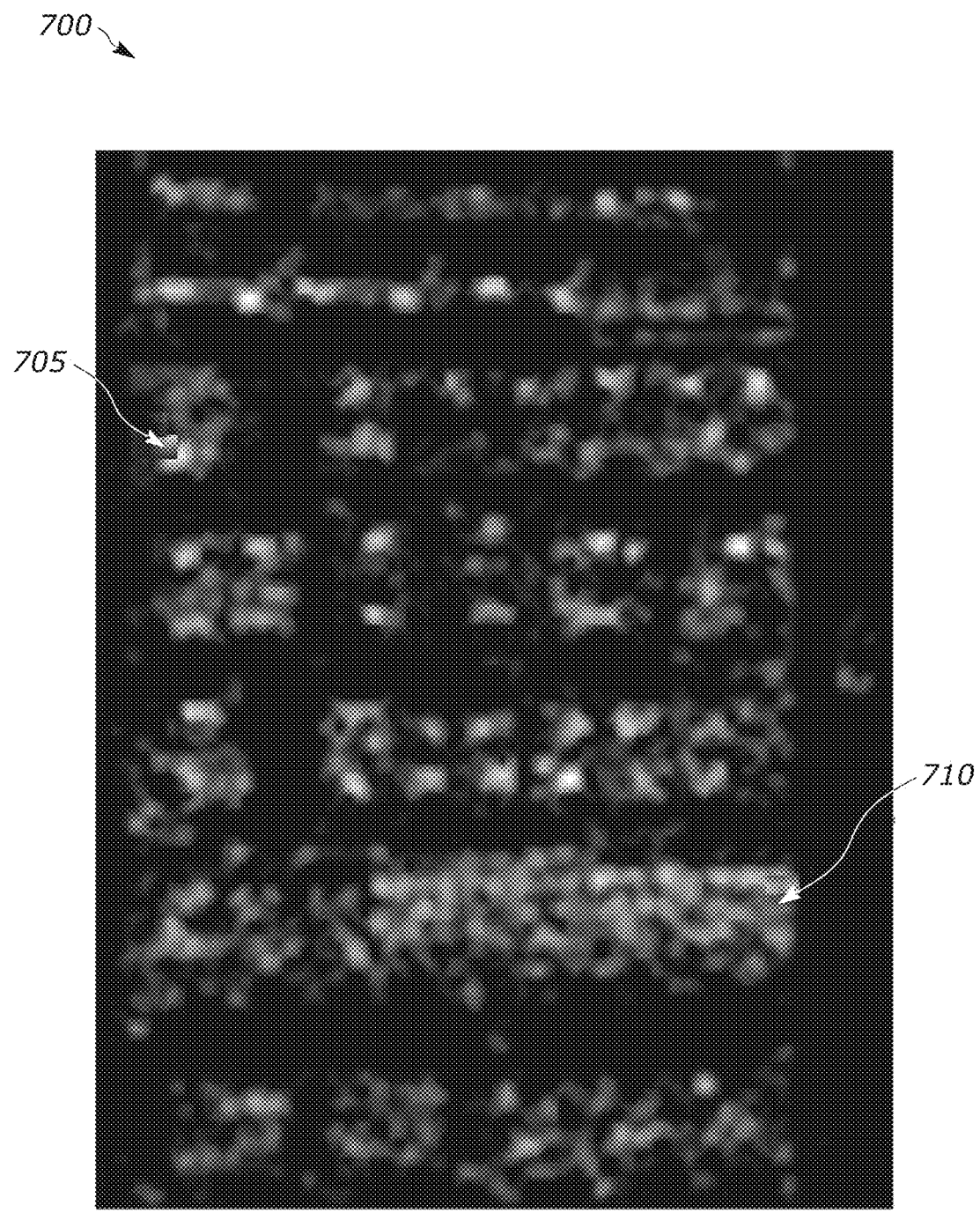
FIG. 7 illustrates example barcode indicative characteristics in the form of feature densities for the color image of FIG. 6.

FIG. 7 is a graph 700 illustrating example barcode indicative characteristics in the form of feature densities for the color image of FIG. 6. Regions having larger feature densities are shown in white, and regions having smaller feature densities are shown in black. As shown in FIG. 7, regions corresponding to the barcodes (a region 705 corresponding to the barcode 605 of FIG. 6) are white, as well as feature-rich non-barcode regions (e.g., a region 710 corresponding to the non-barcode area 610). Thus, if only feature densities are used to identify regions of the color image 600 for decoding, a barcode decoder would attempt to decode a barcode in many regions of the image 600 not containing a barcode.

When the barcodes to be decoded are black and white, the processor 115 excludes the regions (e.g., the region 710) that contain color and, thus, do not contain a barcode. Accordingly, the processor 115 identifies a subset of the regions of the color image 120 that contain little if any color content. When the barcodes to be decoded are some other color (e.g., red and white, etc.), the processor 115 may identify a subset of the regions that contain little if any other color content (e.g., other than red). The processor 115 determines a color content amount for each region of the image 105 that represents the amount of color (outside of that of the barcodes) present in the region. For example, the processor 115 may determine, for each region, a color content amount that is the maximum value of all the color components (e.g., the U and V components of the image 120) of all pixels in the region. Alternatively, the processor 115 may determine, for each region, a color content amount that includes a maximum value of each the color components (e.g., the U and V components of the image 120) of all pixels in the region.

The processor 115 identifies, based on the barcode indicative characteristics and the color content amounts, the regions 125 of the color image 105 that likely contain a barcode. For example, the processor 115 may identify for decoding those regions 125 whose feature density satisfies a first criteria (e.g., the feature density exceeds a first pre-determined threshold indicative of a barcode) and whose color content amounts satisfies a second criteria (e.g., the amount of color is less than a second pre-determined threshold indicative of an area with little, if any, color content such as a black and white region). That is, the processor 115 excludes from consideration by a barcode decoder those regions of the color image that include at least a threshold amount of color and are, thus, not-likely to contain a barcode.

Alternatively, the processor 115 may determine a mask that represents whether the color content amount in each regions satisfies the second criteria (e.g., the amount of color is less than the second pre-determined threshold). The mask has a value of "1" for regions not containing a threshold amount of color, and a value of "0" for regions containing at least a threshold amount of color. The processor 115 applies the mask to the barcode indicative characteristics (e.g., by multiplying the feature densities with the mask), and then compares the masked characteristics with the first pre-determined threshold to identify the regions 125 of the color image for barcode decoding.

Figure 8:
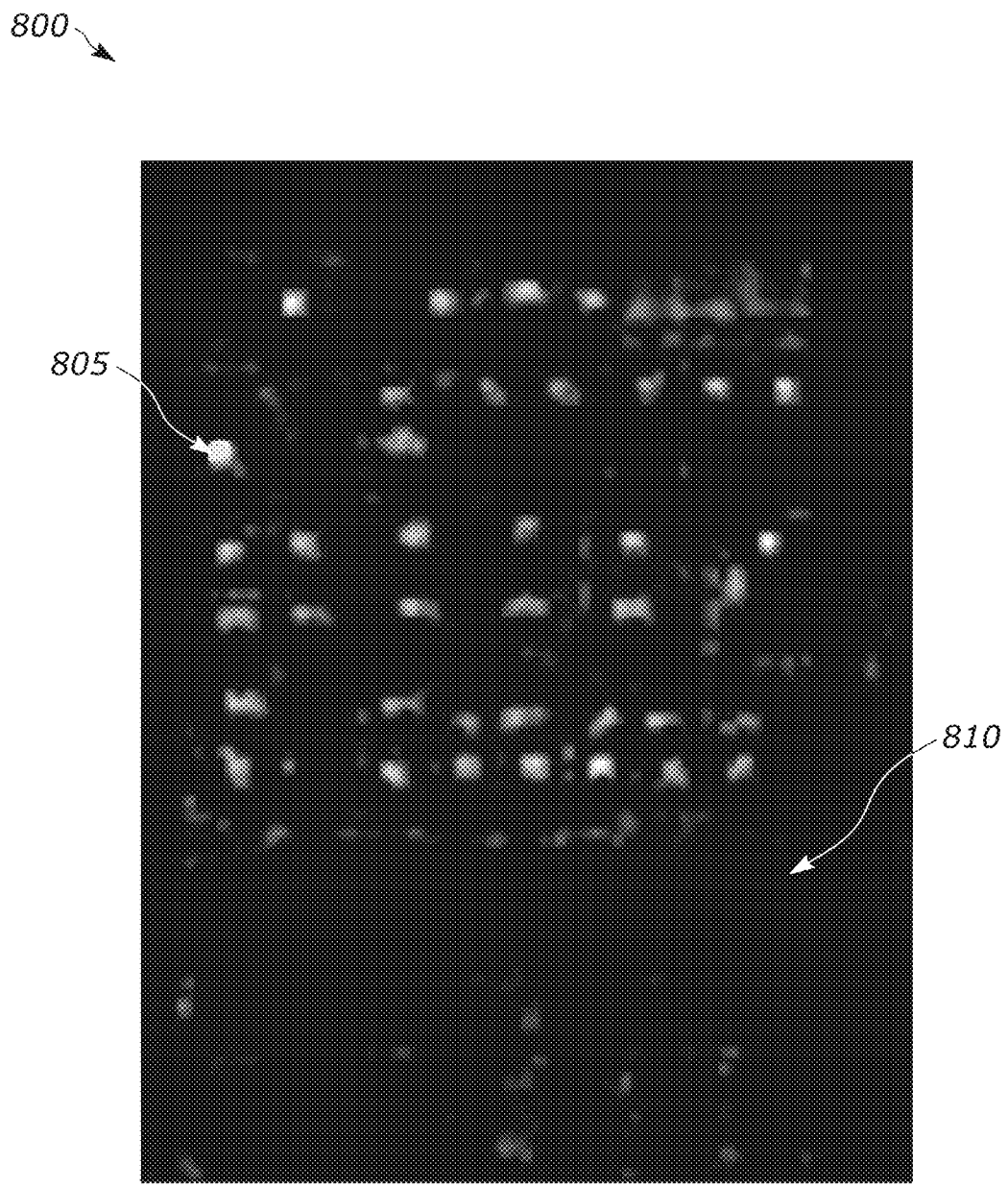
FIG. 8 illustrates example barcode indicative characteristics for the color image of FIG. 6 after regions including color content are excluded or masked.

FIG. 8 is a graph 800 illustrating example barcode indicative characteristics in the form of feature densities for the example color image of FIG. 6 once regions containing at least a threshold amount of color are excluded. For example, having their feature densities masked out or set to zero and, thus, now shown as black in FIG. 8. Like FIG. 7, regions having larger feature densities are shown in white, and regions having smaller feature densities are shown in black. As shown in FIG. 8, regions corresponding to a barcode (a region 805 corresponding to the barcode 605 of FIG. 6) are still white, while feature-rich non-barcode regions containing color (e.g., a region 810 corresponding to the non-barcode area 610) are now black. Thus, if only those regions still having larger feature densities as shown with white in FIG. 8 (e.g., a region 805 corresponding to the barcode 605 of FIG. 6) are identified for decoding, a barcode decoder would attempt to decode a barcode in far fewer regions of the image 600.

To decode barcodes, the system 100 includes any number and/or type(s) of example barcode decoders 130. For each region 125 identified by the processor 115, the barcode decoder 130 attempts to decode a barcode using at least some image data corresponding to the region 125 (e.g., at least some pixel data for at least some of the pixels of the region 125). The barcode decoder 130 may process the pixel data of the image 105 and/or the pixel data of the image 120 corresponding to a region to decode a barcode. If a partial barcode is located, then a barcode decoder 130 might expand an identified region that is being decoded to include an adjacent region.

Example processors 115 include a programmable processor, programmable controller, graphics processing unit (GPU), digital signal processor (DSP), etc. capable of executing instructions to, for example, implement operations of the example methods described herein. Additionally and/or alternatively, the processor 115 may include one or more logic circuits capable of, for example, implementing operations of the example methods described herein without executing software or instructions. In some examples, the processor 115 and the barcode decoder 130 are implemented by the same device.

Figure 2:
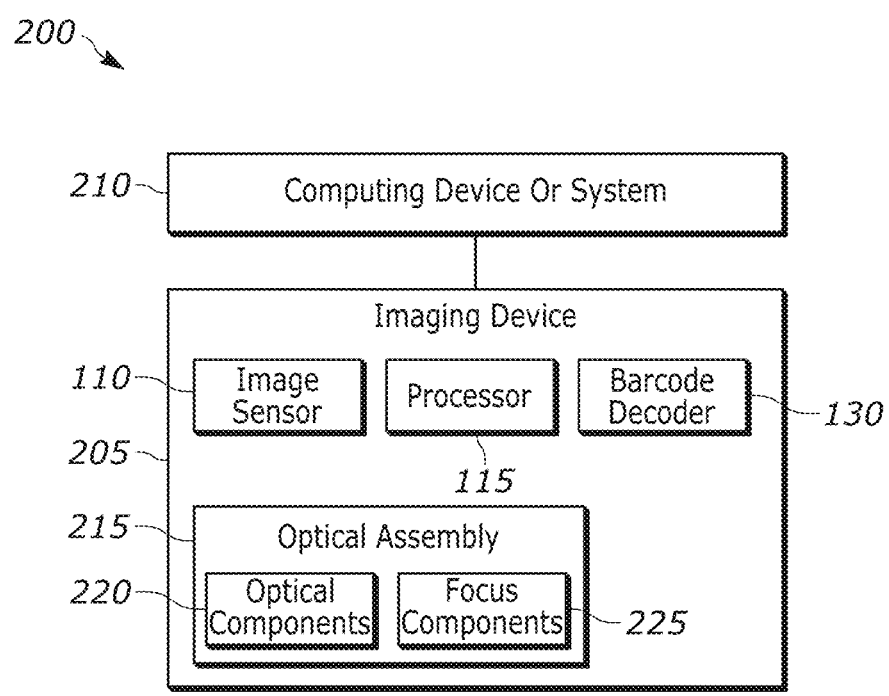
FIG. 2 is a block diagram of an example imaging device that may be used to implement the example system of FIG. 1 for locating and decoding barcodes in color images, in accordance with embodiments of the disclosure.

FIG. 2 is a block diagram of an example system 200 having an imaging device 205 that may be configured to implement the system 100 of FIG. 1 and provides the payload of decoded barcodes, indicia, direct product markings (DPMs), etc. to a host computing device or system 210. The imaging device 205 may be, for example, a handheld scanner that may operate in a handheld and/or handsfree mode, a bioptic scanner, a machine vision system, a slot scanner, etc. that are configured to decode barcodes and provide the payload of the decoded barcodes to the host computing device or system 210. The imaging device 205 may also be, for example, a general-purpose computing device (e.g., a computer, a laptop, a mobile device such as a mobile phone, a tablet, etc.), a headset or other wearable device (e.g., an augmented reality headset, etc.), or any other type of computing device or system having a communication interface and a camera for capturing images, and configurable to process such images for locating and decoding barcodes. An example logic circuit 500 that may be used to implement the imaging device 205 is discussed below in connection with FIG. 5.

As shown in FIG. 2, the imaging device 205 includes the image sensor 110, the processor 115 and the barcode decoder 130 of FIG. 1. In some examples, the processor 115 of FIG. 2 implements, in addition to the image processing described above for identifying regions 125 of a color image likely containing barcodes, controls the overall operation of the imaging device 205. For example, the processor 115 may control the image sensor 110 to capture color images, control the barcode decoder 130 to decode barcodes in the identified regions 125, execute an operating system, provide one or more user interfaces, respond to user inputs, execute one or more applications on behalf of a user, etc. In some examples, the processor 115 and the barcode decoder 130 are implemented by the same device.

The imaging device 205 includes an optical assembly 215 to form images of targets in a FOV on a surface of the image sensor 110. The optical assembly 215 may include any number and/or type(s) of optical elements and/or components 220 including, for example, one or more lenses, filters, focus motors, apertures, lens holder, liquid lenses, or any other components and/or optical elements.

In some examples, to focus the optical assembly 215 on a target, the optical assembly 215 includes any number and/or type(s) of focus components 225 (e.g., motors, liquid lenses, etc.). In some examples, some of the focus components 225 (e.g., an autofocus controller) are implemented by the processor 115. Alternatively, the optical assembly 215 is a fixed focus optical assembly.

While not shown in FIG. 2 for clarity of illustration, the imaging device 205 may include an aiming pattern generator configured to provide an illuminated aiming pattern to assist a user in directing the imaging device 205 toward a target of interest, and/or an illumination generator to emit light in a FOV to, for example, facilitate autofocus and/or improve the quality of image frames captured by the image sensor 110.

Figure 3:
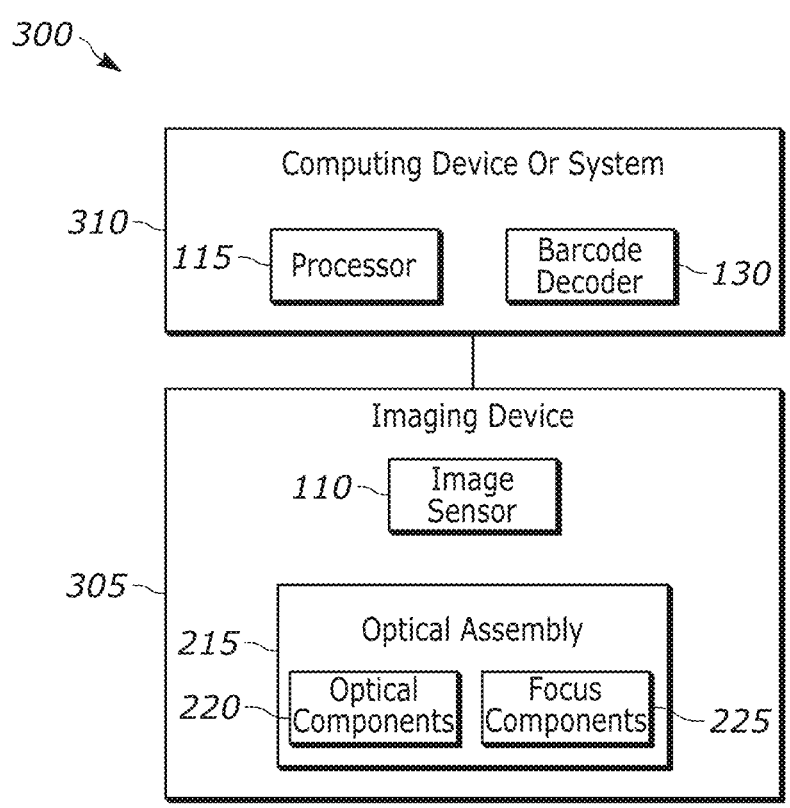
FIG. 3 is a block diagram of an example system having a computing device and an imaging device that may be used to implement the example system of FIG. 1 for locating and decoding barcodes in color images, in accordance with embodiments of the disclosure

FIG. 3 is a block diagram of an example system 300 having an imaging device 305 for capturing and providing color images, and a host computing device or system 310 for locating and decoding barcodes in the provided color images that together may implement the system 100 of FIG. 1. The imaging device 305 may be, for example, a handheld scanner that may operate in a handheld and/or handsfree mode, a bioptic scanner, a machine vision system, a slot scanner, etc. that are configured to provide captured color images to the host computing device or system 310. The imaging device 305 may also be, for example, a general-purpose computing device (e.g., a computer, a laptop, a mobile device such as a mobile phone, a tablet, etc., a headset or other wearable device (e.g., an augmented reality headset, etc.), or any other type of computing device or system) having a communication interface and a camera for capturing images, and configurable to provide images to the host computing device or system 310. As shown in FIG. 3, the imaging device 205 includes the image sensor 110 of FIG. 1.

As shown in FIG. 3, the computing device or system 310 includes the processor 115 and the barcode decoder 130 of FIG. 1. In some examples, the processor 115 of FIG. 3 implements, in addition to the image processing described above for identifying regions 125 of a color image likely containing barcodes, controls the overall operation of the computing device or system 310. For example, the processor 115 may control the reception of color images from the imaging device 305, control the barcode decoder 130 to decode barcodes in identified regions 125, execute an operating system, provide one or more user interfaces, respond to user inputs, execute one or more applications on behalf of a user, etc. The computing device or system 310 may be a server for processing color images containing barcodes, a point-of-sale (POS) system, etc. An example logic circuit 500 that may be used to implement the imaging device 305 and/or the computing device or system 310 is discussed below in connection with FIG. 5. In some examples, the processor 115 and the barcode decoder 130 are implemented by the same device.

Figure 4:
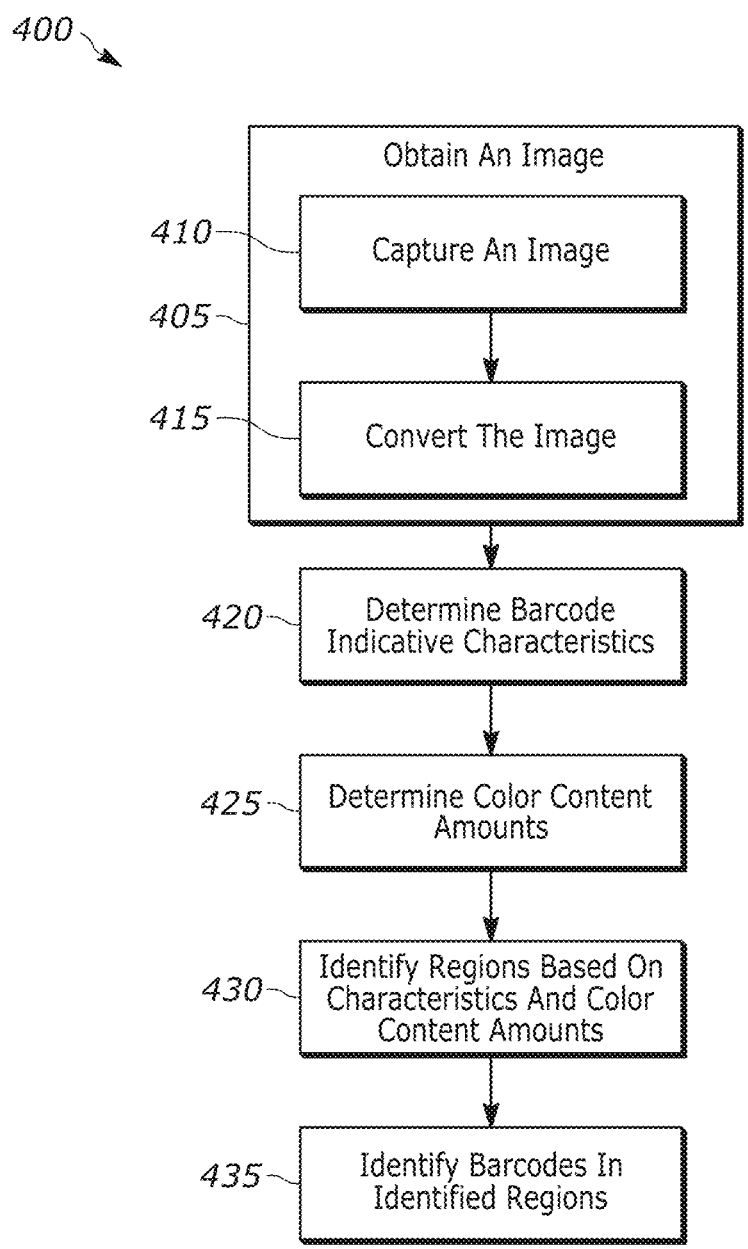
FIG. 4 is a flowchart representative of an example method, hardware logic, machine-readable instructions, or software for locating and decoding barcodes in color images, in accordance with embodiments of the disclosure.

FIG. 4 is a flowchart 400 representative of example processes, methods, software, machine-readable instructions, etc. for implementing the system 100 of FIG. 1, the imaging device 205 of FIG. 2 and/or the system 300 of FIG. 3. Any or all of the blocks of FIG. 4 may be an executable program or portion(s) of an executable program embodied in software and/or machine-readable instructions stored on a non-transitory, machine-readable storage medium for execution by one or more processors such as the processor 502 of FIG. 5. Additionally and/or alternatively, any or all of the blocks of FIG. 4 may be implemented by one or more hardware circuits structured to perform the corresponding operation(s) without executing software or instructions.

The flowchart 400 of FIG. 4 begins at block 405 with a color image being obtained. In some examples, the color image is a processed color image obtained indirectly (block 405) by the processor 115 by: controlling the image sensor 110 to capture a first color image 105 according to a first color-encoding scheme (e.g., an RGB image) at block 410; obtaining the first color image 105 from the image sensor 110; and converting the first color image 105 to the processed color image 120 that is encoded with a second color-encoding scheme that includes luminance and color components (e.g., a YUV image) at block 415. In other examples, the processor 115 controls the image sensor 110 at block 410 to directly capture images according to a color-encoding scheme that includes luminance and color components (e.g., a YUV image) such that they may not need to be converted at block 415.

The processor 115 determines, based on the luminance components of the image obtained at block 405, a plurality of barcode indicative characteristics (e.g., feature densities, bullseyes, "L"s, contrasts, etc.) for respective ones of a plurality of regions of the color image (block 420). An example feature density of a region of the color image representative of the number of features detected in the region. A feature density of a region of the color image may be computed by detecting, determining, etc. whether or not a feature is present at each pixel of the region, and assigning a first value (e.g., "1") to a pixel when a feature is found, and assigning a second value (e.g., "0") to the pixel when a feature is not found. The assigned values are then grouped and/or binned to compute a feature density for the region by, for example, computing an average of the assigned values for the region.

The processor 115 determines, based on the color components of the image obtained at block 405, a plurality of color content amounts for respective ones of the plurality of regions of the color image (block 425). When the barcodes to be decoded are black and white, the processor 115 may determine the color content amount of a region as the maximum value of all of the color components (e.g., the U and V components of the image) of all pixels in the region. Alternatively, the processor 115 may determine, for each region, a color content amount that includes a maximum value of each the color components (e.g., the U and V components of the image 120) of all pixels in the region. When the barcodes to be decoded are some other color (e.g., red and white, etc.), the processor 115 may determine the color content amount of a region as the maximum values of all the other color components (e.g., blue color components) of all pixels in the region.

The processor 115 identifies, based on the barcode indicative characteristics, and the color content amounts, the regions 125 of the color image obtained at block 405 that likely contain a barcode (block 435). The processor 115 may identify for decoding those regions 125 whose barcode indicative characteristic(s) satisfies a first criteria (e.g., the feature density exceeds a first pre-determined threshold indicative of a barcode) and whose color content amounts satisfies a second criteria (e.g., the amount of color is less than a second pre-determined threshold indicative of a black and white region).

For each region 125 identified by the processor 115 at block 430, the barcode decoder 130 attempts to decode a barcode using at least some image data corresponding to the region 125. The barcode decoder 130 may process the pixel data of the image 105 and/or the pixel data of the image 120 corresponding to a region 125 to decode a barcode. If a partial barcode is located, then a barcode decoder might expand an identified region 125 that is being decoded to include an adjacent region.

In some examples, the sizes and/or shapes of the regions 125 are selected based upon the expected sizes and/or shapes of the barcodes in a color image to be decoded. Thus, if differently sized and/or shaped barcodes are to be located and decoded, blocks 420, 425 and 430 may be repeated with differently sized and/or shaped regions. In some examples, the sizes and/or shapes of the regions 125 are pre-determined. In other examples, the sizes and/or shapes of the regions 125 are adaptively determined based on the sizes and/or shapes of identified barcodes. For example, if only partial barcodes are being located, then the sizes and/or shapes of the regions 125 could be adjusted to be larger.

Figure 5:
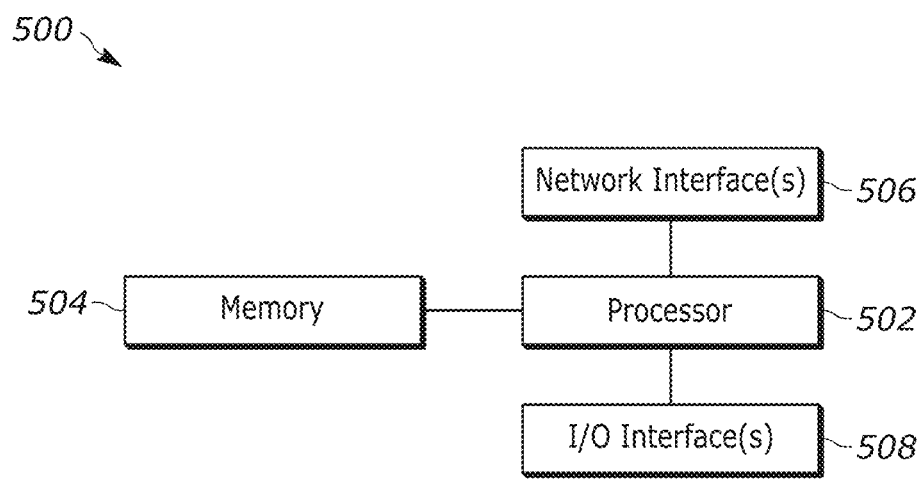
FIG. 5 is a block diagram of an example logic circuit for implementing example methods and/or operations described herein.

FIG. 5 is a block diagram representative of an example logic circuit capable of implementing, for example, one or more components of the example system 100 of FIG. 1, the example imaging device 205 of FIG. 2, and/or the example system 300 of FIG. 3 for locating and decoding barcodes in color images. The example logic circuit of FIG. 5 is a processing platform 500 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 500 of FIG. 5 includes a processor 502 such as, for example, one or more microprocessors, controllers, and/or any suitable type of processor. The example processing platform 500 of FIG. 5 includes memory (e.g., volatile memory, non-volatile memory) 504 accessible by the processor 502 (e.g., via a memory controller, not shown for clarity of illustration). The example processor 502 interacts with the memory 504 to obtain, for example, machine-readable instructions stored in the memory 504 corresponding to, for example, the operations represented by the flowcharts of this disclosure. Additionally or alternatively, machine-readable instructions corresponding to the example operations described herein may be stored on one or more removable media (e.g., a compact disc (CD), a digital versatile disc (DVD), removable flash memory, etc.) that may be coupled to the processing platform 500 to provide access to the machine-readable instructions stored thereon.

The processing platform 500 of FIG. 5 includes one or more communication interfaces such as, for example, one or more network interfaces 506, and/or one or more input/ output (I/O) interfaces 508. The communication interface(s) enable the processing platform 500 of FIG. 5 to communicate with, for example, another device (e.g., the computing device or system 210), system, host system (e.g., a POS system), datastore, database, and/or any other machine.

The example processing platform 500 of FIG. 5 also includes the network interface(s) 506 to enable communication with other machines via, for example, one or more networks. The example network interface 506 includes any suitable type of communication interface(s) (e.g., wired and/or wireless interfaces) configured to operate in accordance with any suitable protocol(s).

The example, processing platform 500 of FIG. 5 also includes the input/output (I/O) interface(s) 508 to enable receipt of user input and communication of output data to the user.

The above description refers to a block diagram of the accompanying drawings. Alternative implementations of the example represented by the block diagram includes one or more additional or alternative elements, processes and/or devices. Additionally or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed. Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The claims are:

1. A method for locating barcodes, the method comprising:
    obtaining a color digital image using, directly or indirectly, an image sensor, wherein the color digital image includes a plurality of pixels represented by respective ones of a plurality of luminance components and respective ones of a plurality of color components;
    determining, based on the plurality of luminance components, a plurality of barcode indicative characteristics for respective ones of a plurality of regions of the color digital image;
    determining, based on the plurality of color components, a plurality of color content amounts for respective ones of the plurality of regions;
    identifying one or more regions of the plurality of regions that have their respective color content amount satisfy a first criteria, and their respective barcode indicative characteristic satisfy a second criteria; and
    processing at least some image data corresponding to each of the one or more regions of the color digital image to attempt to identify one or more barcodes in the color digital image.

2. The method of claim 1, wherein a respective color content amount satisfies the first criteria when the respective color content amount is less than a predetermined threshold, the predetermined threshold representing a small color content amount.

3. The method of claim 1, wherein a respective barcode indicative characteristic satisfies the second criteria when a feature density is greater than a predetermined threshold, the predetermined threshold representing a feature density indicative of a barcode.

4. The method of claim 3, wherein the feature density for a region represents a number of features detected in the region.

5. The method of claim 1, wherein the barcode indicative characteristic for a region include at least one of a dot, a line, a corner, an L-shape, a contrast, or a bullseye.

6. The method of claim 1, wherein the determining the barcode indicative characteristics for respective ones of the plurality of regions comprises:
    determining, based on the plurality of luminance components, a plurality of feature densities for respective ones of a plurality of pixels; and
    grouping the plurality of feature densities to form the barcode indicative characteristics.

7. The method of claim 6, wherein the grouping the plurality of feature densities includes computing averages over subsets of the plurality of feature densities.

8. The method of claim 1, further comprising selecting a size of the plurality of regions based on an expected size of the barcode.

9. The method of claim 1, wherein the method of claim 1 is performed for each of the plurality of regions having a first size, and further comprises repeating the method of claim 1 for each of the plurality of regions having a second size.

10. The method of claim 1, wherein the color digital image is a processed color digital image, and wherein the obtaining the processed color digital image using the image sensor includes:
    capturing a first color digital image with the imaging sensor;
    receiving the first color digital image at a processor from the image sensor; and
    converting, at the processor, the first color digital image to obtain the processed color digital image.

11. The method of claim 10, wherein the first color digital image is encoded using an RBG color-encoding scheme, and the processed color digital image is encoding using a YUV color-encoding scheme.

12. The method of claim 1, wherein the obtaining the color digital image using the image sensor includes capturing the color digital image with image sensor.

13. The method of claim 1, wherein the color digital image is encoded using a YUV color-encoding scheme, wherein a luminance component of a pixel corresponds to a Y component, wherein a color component of a pixel corresponds to a U component, wherein an additional color component of a pixel corresponds to a V component, and wherein a color content amount for a region is the largest of the U components and the V components of the pixels in the region.

14. An apparatus comprising:
an image sensor configured to capture a first color digital image;
a processor configured to:
convert the first color digital image to a second color digital image, wherein the second color digital image includes a plurality of pixels represented by respective ones of a plurality of luminance components and respective ones of a plurality of color components;
determine, based on the plurality of luminance components, a plurality of barcode indicative characteristics for respective ones of a plurality of regions of the second color digital image;
determine, based on the plurality of color components, a plurality of color content amounts for respective ones of the plurality of regions; and
identify one or more regions of the plurality of regions that have their respective color content amount satisfy a first criteria, and their respective barcode indicative characteristic satisfy a second criteria; and
a barcode decoder configured to process at least some image data corresponding to each of the one or more regions to attempt to identify one or more barcodes in the second color digital image.

15. The apparatus of claim 14, wherein a respective color content amount satisfies the first criteria when the respective color content amount is less than a predetermined threshold, the predetermined threshold representing a small color content amount.

16. The apparatus of claim 14, wherein a respective barcode indicative characteristic satisfies the second criteria when a feature density is greater than a predetermined threshold, the predetermined threshold representing a feature density indicative of a barcode.

17. The apparatus of claim 14, wherein the first color digital image is encoded using an RGB color-encoding scheme, wherein the second color digital image is encoded using a YUV color-encoding scheme, wherein a luminance component of a pixel corresponds to a Y component, wherein a color component of a pixel corresponds to a U component, wherein an additional color component of a pixel corresponds to a V component, and wherein a color content amount for a region is the largest of the U components and the V components of the pixels in the region.

18. The apparatus of claim 14, wherein the processor is further configured to determine the barcode indicative characteristics for respective ones of the plurality of regions by:
determining, based on the plurality of luminance components, a plurality of feature densities for respective ones of a plurality of pixels; and
binning the plurality of feature densities to form the barcode indicative characteristics.

19. A non-transitory, computer-readable, storage medium storing computer-readable instructions that, when executed by one or more processors, cause a system to:
obtain a color digital image using, directly or indirectly, an image sensor, wherein the color digital image includes a plurality of pixels represented by respective ones of a plurality of luminance components and respective ones of a plurality of color components;
determine, based on the plurality of luminance components, a plurality of barcode indicative characteristics for respective ones of a plurality of regions of the color digital image;
determine, based on the plurality of color components, a plurality of color content amounts for respective ones of the plurality of regions;
identify one or more regions of the plurality of regions that have their respective color content amount satisfy a first criteria, and their respective barcode indicative characteristic satisfy a second criteria; and
process at least some image data corresponding to each of the one or more regions of the color digital image to attempt to identify one or more barcodes in the color digital image.

20. The non-transitory, computer-readable, storage medium of claim 19, wherein the color digital image is a processed color digital image, and wherein the computer-readable instructions, when executed by the one or more processors, cause the system to obtain the processed color digital image using the image sensor by:
capturing a first color digital image with the image sensor, wherein the first color digital image is encoded using a first color-encoding scheme;
receiving the first color digital image from the image sensor; and
converting the first color digital image to the processed color digital image, wherein the processed color digital image is encoded using a second color-encoding scheme.

21. The non-transitory, computer-readable, storage medium of claim 19, wherein a respective color content amount satisfies the first criteria when the respective color content amount is less than a predetermined threshold, the predetermined threshold representing a small color content amount.

22. The non-transitory, computer-readable, storage medium of claim 19, wherein a respective barcode indicative characteristic satisfies the second criteria when a feature density is greater than a predetermined threshold, the predetermined threshold representing a feature density indicative of a barcode.

23. The non-transitory, computer-readable, storage medium of claim 19, wherein the color digital image is encoded using a YUV color-encoding scheme, wherein a luminance component of a pixel corresponds to a Y component, wherein a color component of a pixel corresponds to a U component, wherein an additional color component of a pixel corresponds to a V component, and wherein a color content amount for a region is the largest of the U components and the V components of the pixels in the region.

24. The non-transitory, computer-readable, storage medium of claim 19, wherein the computer-readable instructions, when executed by the one or more processors, cause the system to determine the barcode indicative characteristics for respective ones of the plurality of regions by:
determining, based on the plurality of luminance components, a plurality of feature densities for respective ones of a plurality of pixels; and
binning the plurality of feature densities to form the barcode indicative characteristics.

* * * * *